United States Patent [19]
Flückiger

[11] Patent Number: 5,234,300
[45] Date of Patent: Aug. 10, 1993

[54] FASTENING MEANS

[76] Inventor: Werner Flückiger, Kreuzbüntenstrasse 765, 5727 Oberkulm, Switzerland

[21] Appl. No.: 763,131

[22] Filed: Sep. 20, 1991

[30] Foreign Application Priority Data

Sep. 20, 1990 [CH] Switzerland .................... 3039/90

[51] Int. Cl.$^5$ .................................. F16B 35/02
[52] U.S. Cl. ........................... 411/383; 411/107; 411/337
[58] Field of Search ............. 411/107, 103, 178, 383, 411/180, 394, 337, 384, 385, 389, 388, 378

[56] References Cited

U.S. PATENT DOCUMENTS

| | | |
|---|---|---|
| 1,705,086 | 3/1929 | Ferguson . |
| 3,667,338 | 6/1972 | Johansson .................... 411/378 |
| 4,655,656 | 4/1987 | Jonsson ........................ 411/337 |

FOREIGN PATENT DOCUMENTS

| | | |
|---|---|---|
| 292742 | 11/1988 | European Pat. Off. ............ 411/386 |
| 3340666 | 5/1985 | Fed. Rep. of Germany . |
| 8501544 | 4/1985 | PCT Int'l Appl. . |
| 659294 | 1/1987 | Switzerland . |
| 670125 | 5/1989 | Switzerland ........................ 411/389 |

Primary Examiner—Rodney M. Lindsey
Attorney, Agent, or Firm—Gordon W. Hueschen

[57] ABSTRACT

The fastening means consists of a screw and a sleeve held rotatably in such a manner on the screw that the screw and the sleeve can be rotated by means of a tool simultaneously or subsequently. The sleeve is held on the screw on the one hand by an annular projection and on the other hand by a widened tubelike edge. This design allows a simple production and assembling of screw and sleeve on a machine.

9 Claims, 1 Drawing Sheet

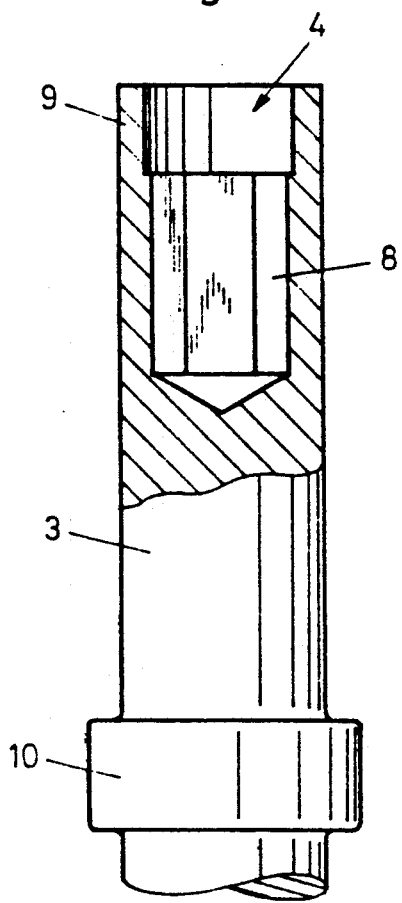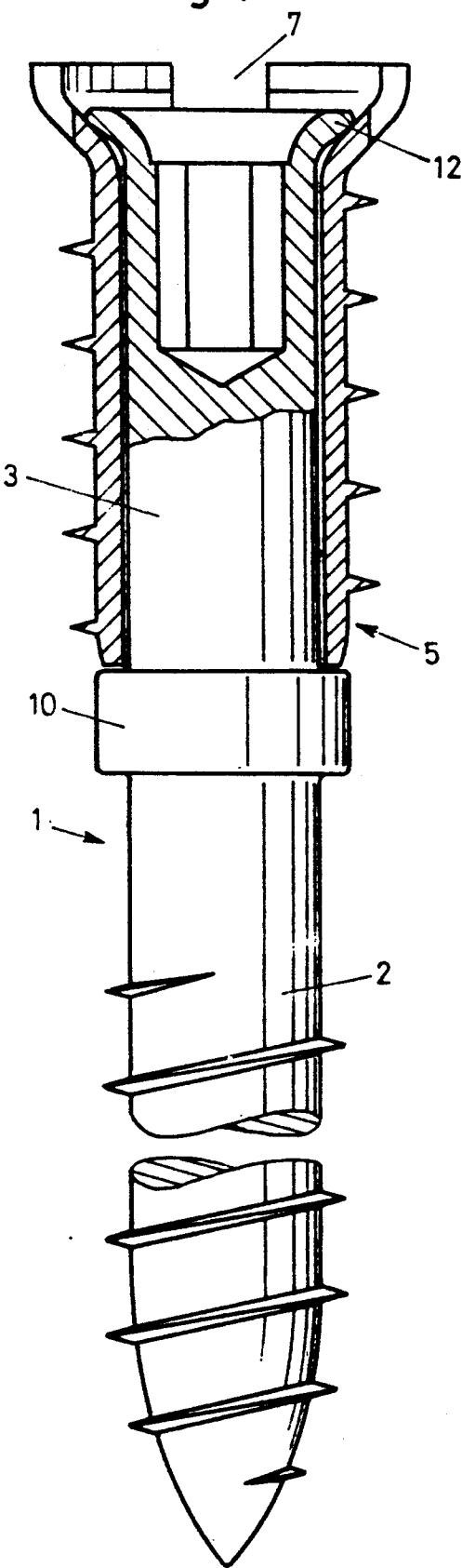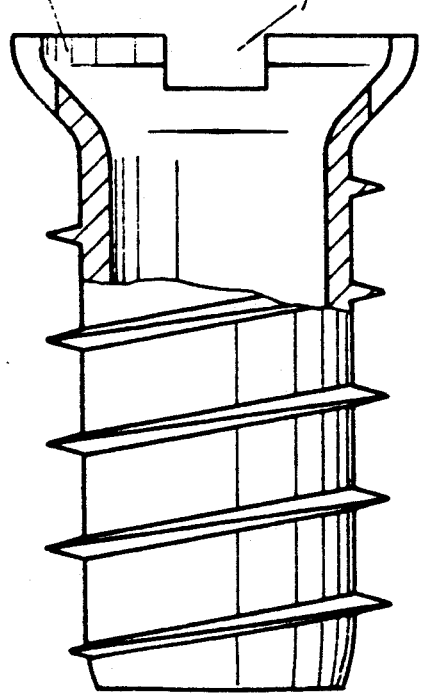

FASTENING MEANS

BACKGROUND OF THE INVENTION

1. Field Of The Invention

The present invention relates to a fastening means including a screw having a recess for receipt of a tool, and including a sleeve having an outer thread and having means for receipt of a further tool, which sleeve is rotatably supported on the screw and guided thereupon against an axial movement relative thereto, such that the screw and/or the bolt may be rotated.

2. Description Of The Prior Art

Fastening means of the kind set forth above are generally known. According to a known design the sleeve is pushed onto the screw from the side having the thread and is held on the screw by means of a collar which has been rolled in or by means of arresting members. This design features, however, the drawback that the cross section of the screw is weakened considerably, which leads often to a rupturing of the screw.

According to a further known design the sleeve is slotted along a certain length thereof, such to hold the sleeve at the head of the screw or at a projection at the screw, whereby the sleeve is pressed over the head of the screw or over the projection. The drawback of this design is that the sleeve must consist of an elastically deformable material in order to allow a placing thereof onto the screw, and that due to an accordingly selected material it is possible that the portion of the sleeve which is engaged by a tool can deform when using the screw. A hardening of screws including the sleeve placed thereupon leads to a jamming of the mounted sleeve.

A further drawback of both designs is that their production is quite expensive.

SUMMARY OF THE INVENTION

Accordingly, it is a general object of the present invention to provide a fastening means of the kind mentioned above, in which a rupturing at the screw and at the sleeve due to tools engaging same is avoided.

A further object is to provide a fastening means, in which the screw comprises a projecting portion, a cylinder shaped portion forming a tubelike portion and a hexagonal recess adjacent the cylinder shaped portion and adapted for receipt of a tool, which tubelike portion is expanded at its edge in a radial direction such to hold the sleeve on the screw, which sleeve abuts the projecting portion, which recess for receipt of a tool is located at the face end of the screw, and which sleeve comprises an edge portion having an enlarged inner diameter, in which edge portion the means for receipt of a further tool are included.

Still a further object of the invention is to provide a fastening means, in which the sleeve is held at the screw at two locations, whereby the location where a driving force is applied onto the fastening means is remote from the location where the sleeve is held on the screw, and which fastening means lends itself to a completely automatic and low cost production, such that the fastening means can be produced and purchased in a ready to use state.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 is an illustration of an embodiment of the invention in a partly cut-off state and partly in section;

FIG. 2 illustrates the sleeve of FIG. 1 partly in a side view and partly in a section; and FIG. 3 is an illustration of the head portion of the screw shown in FIG. 1 prior to the mounting of the sleeve thereupon, partly in a side view and partly in section.

DESCRIPTION OF THE PREFERRED EMBODIMENT

The embodiment illustrated in FIG. 1 consists of a screw 1 having a threaded portion 2 and a shaft portion 3, which includes a recess 4 for receipt of a not particularly illustrated tool, and further of a sleeve 5 which includes four slots 7 located in an edge portion 6 thereof and is held in such a manner on the shaft portion 3 that the screw 1 and the sleeve 5 may be individually rotated by the tool or also may be rotated together by the tool.

The recess 4 consists of a cylinder shaped portion, such to form a tubelike section 9 and a hexagonal recess 8 formed adjacent the tubelike portion 9.

FIG. 2 illustrates that the sleeve 5 has an outer thread, of which the pitch equals the pitch of the thread at the threaded portion 2 of the screw 1. The edge portion 6 having the slots 7 is widened in such a manner that a funnel-like portion is formed.

As is shown in FIG. 1, the sleeve 5 is held on the shaft portion 3 by an annular projection 10 formed at the shaft portion 3 and furthermore by a flanged portion 12 of the tubelike portion 9, whereby this flanged portion 12 abuts or rests against, respectively, the inner side of the widened edge portion 6 of the sleeve 5.

By this design an advantageous holding of the sleeve 5 on the shaft portion 3 is arrived at, without that the cross section of the screw 1 and of the sleeve 5 is weakened.

The screw 1 and the sleeve 5 are pressed products which can be produced at extremely high true measurements. Due to these reasons it is possible to mount the sleeve 5 automatically onto the shaft portion 3 of the screw 1 because the flanging of the tubelike portion can be made quite easily. This is a specific advantage of the subject of the invention presented herein. By means of this simple production step it is possible to produce the fastening means at very low costs and at the same time with a high quality.

While there is shown and described a present preferred embodiment of the invention, it is to be distinctly understood that the invention is not limited thereto, but may be otherwise variously embodied and practiced within the scope of the following claims.

It is, for instance, also possible to design the shaft portion 3 with a diameter which is smaller than the outer diameter of the thread at the threaded portion 2, such that the sleeve 5 is held at the uppermost thread.

In place of the hexagonal recess 8 it is also possible to design the screw 1 as cross-slotted screw.

The sleeve can consist of a material having strength values which are higher than those of the material at the screw.

According to one embodiment the sleeve 5 consists of a hardened steel.

I claim:

1. A fastening means comprising: a screw having a threaded portion having a selected outer diameter and an unthreaded portion having a diameter less than the threaded portion, the unthreaded portion having a face end with a recess therein for receipt of a tool, and including a sleeve having an outer thread and having means for receipt of a further tool, which sleeve is rotatably supported on the unthreaded portion of said screw and is guided thereupon against an axial movement relative thereto, so that said screw and/or said sleeve may be rotated, the sleeve having an inner diameter less than the selected outer diameter of the threaded portion, in which said screw includes a projecting portion, a cylinder-shaped portion forming a tube-like portion and wherein said recess is hexagonal and adjacent said cylinder-shaped portion and said cylinder shaped portion adapted at its edge in a radial direction so as to hold the sleeve on the screw, which sleeve abuts said projecting portion, and which sleeve comprises an edge portion having an enlarged diameter, in which portion the means for receipt of a further tool is included.

2. The fastening means of claim 1, in which said projecting portion is formed by the last course of the thread of the screw.

3. The fastening means of claim 1, in which said screw comprises and a shaft portion, and in which said projecting portion is formed as a collar at the shaft portion.

4. The fastening means of claim 3, in which said tube-like section is flanged outwardly so as to retain said sleeve on said shaft portion.

5. The fastening means of claim 1, in which the sleeve consists of a material of a higher strength than said screw.

6. The fastening means of claim 1, in which the sleeve consists of a hardened steel.

7. A fastening means comprising a screw having a threaded portion having a selected outer diameter and an unthreaded portion having a diameter less than the threaded portion, the unthreaded portion having a face end with a recess therein for receipt of a tool, and including a sleeve having an outer thread and having means for receipt of a further tool, which sleeve is rotatably supported on the unthreaded portion of said screw and guided thereupon against an axial movement relative thereto, so that said screw and/or said sleeve may be rotated, the sleeve having an inner diameter less than the selected outer diameter of the threaded portion, in which screw includes a projecting portion, a cylinder-shaped portion forming a tube-like portion and wherein said recess is hexagonal and adjacent said cylinder-shaped portion and adapted for receipt of a tool, which tube-like portion is outwardly-flanged at its edge in a radial direction so as to hold the sleeve on the screw, which sleeve abuts said projecting portion and in which said sleeve includes an edge portion having an enlarged inner diameter including said means for receipt of a further tool, and in which the outwardly-flanged portion of the tube-like section rests against said edge portion having an enlarged inner diameter.

8. The fastening means of claim 7, in which the sleeve consists of a material of a higher strength than said screw.

9. The fastening means of claim 7, in which the sleeve consists of a hardened steel.

* * * * *

UNITED STATES PATENT AND TRADEMARK OFFICE
CERTIFICATE OF CORRECTION

PATENT NO. : 5,234,300

DATED : August 10, 1993

INVENTOR(S) : Werner Flückiger

It is certified that error appears in the above-indentified patent and that said Letters Patent is hereby corrected as shown below:

Col. 3, line 31; delete "and" (first occurrence).
Col. 4, line 18; insert -- said -- after "which".

Signed and Sealed this

Tenth Day of May, 1994

Attest:

BRUCE LEHMAN

Attesting Officer     Commissioner of Patents and Trademarks